March 21, 1961 W. ARZ 2,975,597
HYDRAULIC TRANSMISSION
Filed July 10, 1959 3 Sheets-Sheet 1

INVENTOR
Walter Arz
by: Michael S. Striker
Attorney

March 21, 1961  W. ARZ  2,975,597
HYDRAULIC TRANSMISSION

Filed July 10, 1959  3 Sheets-Sheet 2

INVENTOR
Walter Arz
by:
Michael S. Striker
Attorney

March 21, 1961 W. ARZ 2,975,597
HYDRAULIC TRANSMISSION
Filed July 10, 1959 3 Sheets-Sheet 3

INVENTOR
Walter Arz
by Michael S. Striker
Attorney

United States Patent Office 2,975,597
Patented Mar. 21, 1961

2,975,597

HYDRAULIC TRANSMISSION

Walter Arz, Aschaffenburg, Germany, assignor to Gesellschaft fuer Linde's Eismaschinen A.G. Zweigniederlassung Gueldner-Motoren-Werke in Aschaffenburg, Aschaffenburg, Germany Filed July 10, 1959, Ser. No. 826,306

8 Claims. (Cl. 60—53)

The present invention relates to a hydraulic transmission, and more particularly to a hydraulic transmission using swash-plate hydraulic apparatus for driving a pair of shafts from a single driven shaft. The transmission of the present invention is preferably used for driving a pair of wheel axles from a drive shaft which is driven by the engine of a vehicle.

The output of swash-plate pumps is adjusted by variation of the angle between the swash-plate and the cylinder block. In known hydraulic transmissions of this type, the drive shaft is provided with a joint on which the swash-plate of the pump is mounted. This joint has to take up the torque between the drive shaft and the swash-plate, and furthermore the reaction forces created in the pump act through the swash-plate on the drive shaft, requiring a thrust bearing. Due to the limited space available in vehicles, the dimensions of the joint are limited, so that only limited forces can be transmitted by the joint. Consequently, the pressure in the pump is limited, resulting in a correspondingly high volume required for the liquid circulated in the hydraulic transmission and in great dimensions of the transmission.

In accordance with other arrangements according to the prior art, the joint of the swash-plate is located outside of the housing of the transmission, so that a comparatively wide opening is required for the passage of the shaft portion whose angular position is varied. Consequently, it is difficult to seal the housing, and the construction of the drive shaft becomes complicated and subject to disturbances.

It is one object of the present invention to overcome the disadvantages of known hydraulic transmissions of this type, and to provide a hydraulic transmission of compact construction and great structural strength.

Another object of the present invention is to provide a hydraulic transmission including a swash-plate pump, and a pair of swash-plate motors, all arranged and sealed in a housing into which a drive shaft and a pair of driven shafts extend.

Another object of the present invention is to rigidly connect the drive shaft to the non-adjustable part of the swash-plate pump, and to mount the adjustable part of the swash-plate pump turnable within the housing.

A further object of the present invention is to provide in a housing a pair of supporting members on which the fixed parts of a pair of swash-plate motors are mounted, and to mount the fixed part of the swash-plate pump turnably on the supporting members.

A further object of the present invention is to mount the swash-plate pump at the center of a housing, and to arrange the two swash-plate motors of the transmission on opposite sides of the pump and inclined to the axis of the pump so that the shafts driven by the swash-plate motors can be arranged aligned with each other, and at right angles to the drive shaft by which the pump is driven.

A further object of the present invention is to arrange the pump and motors of the hydraulic transmission in a housing in such a manner that the housing has a shape similar to the shape of a conventional differential gear transmission as used for vehicles, so that the transmission of the present invention can be used for replacing conventional differential transmissions.

With these objects in view, the present invention mainly consists in a hydraulic transmission which comprises a housing, preferably including two supporting members, swash-plate pump means including a piston-carrier pump member and a cylinder block pump member, a pair of swash-plate motors in the housing and communicating with the swash-plate pump means, a drive shaft extending into the housing and driving the pump means, and a pair of driven shaft means extending into the housing and being driven by the swash-plate motors.

According to the preferred embodiment of the present invention, the drive shaft is rigidly connected to the piston carrier of the pump, while the cylinder block of the pump is mounted on the supporting members in the housing for angular displacement about an axis intersecting with the axis of the drive shaft at right angles. The swash-plate motors are located on opposite sides of the pump, and the cylinder blocks of the motors are fixedly secured to the supporting members in the housing, while the piston carriers of the motors are rotatably mounted in the housing and connected to the driven shafts. The axes of the cylinder blocks of the motors extend at an obtuse angle to each other, and at acute angles to the axis of the drive shaft, and to the turning axis of the cylinder block of the pump.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1b is the right portion of a sectional view of a hydraulic transmission according to the present invention, and the continuation of Fig. 1a;

Figure 1A:
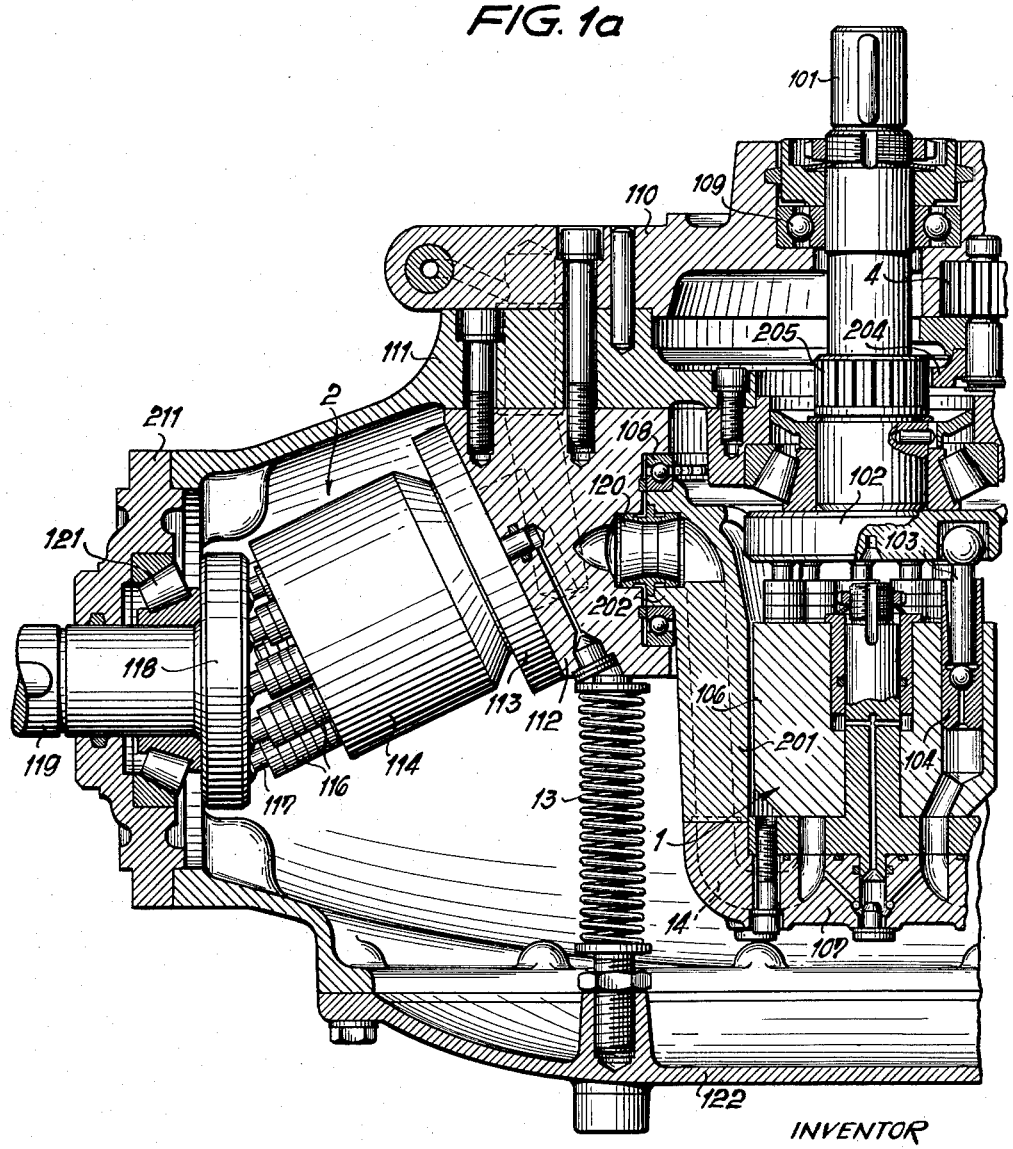
Fig. 1a is the left portion of a longitudinal sectional view of a hydraulic transmission according to the present invention.
Figure 1B:
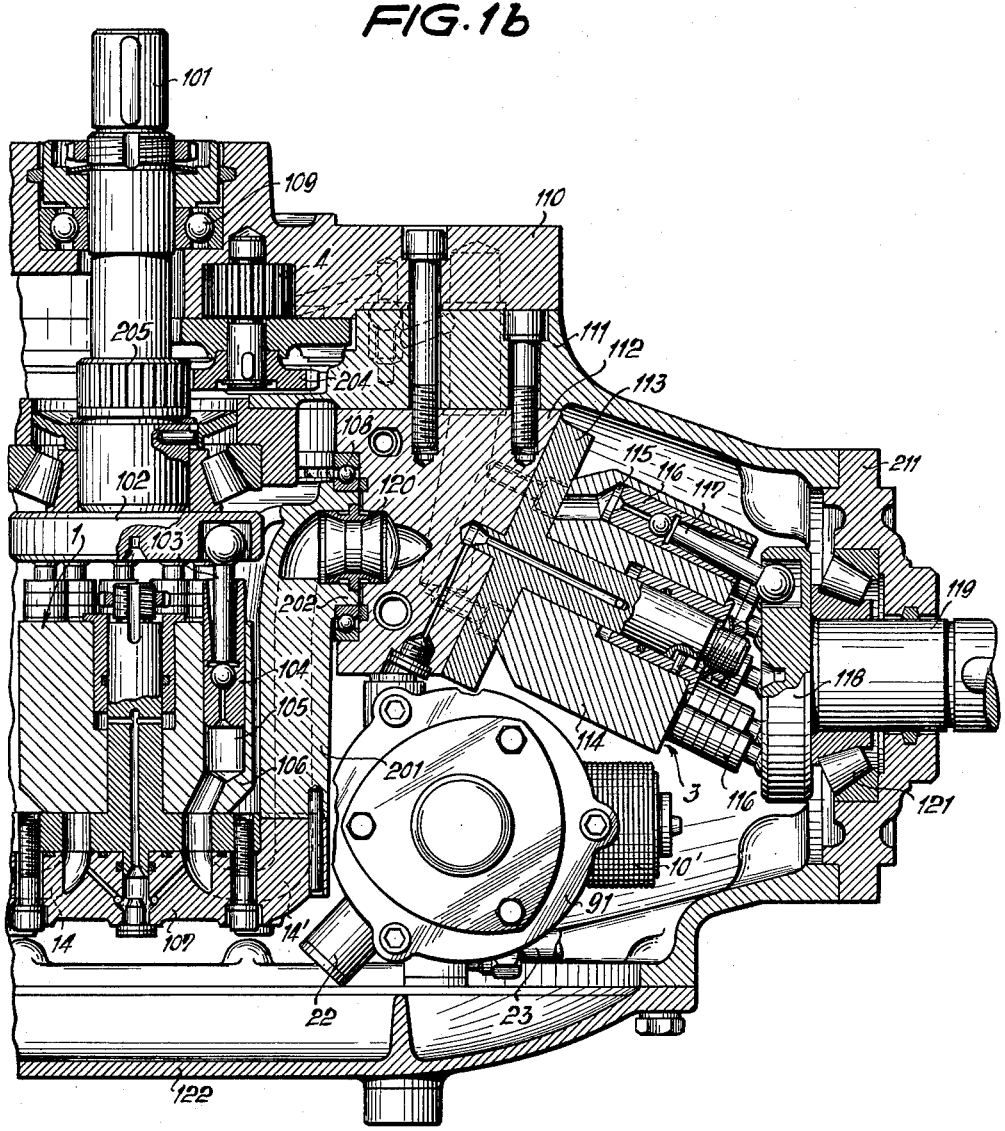

Referring now to the drawings, and more particularly to Figs. 1a and 1b, the engine of a vehicle is connected to the drive shaft 101 of a swash-plate pump means 1. Swash-plate pump 1 includes a piston carrier 102 which is rigidly connected to the drive shaft 101 and carries a set of piston rods 103 terminating in pistons 104. A conical bearing 109' supports the piston carrier 102 in axial direction to compensate hydraulic pressure. Pistons 104 are movable in cylinders 105 of a cylinder block 106. Cylinder block 106 cooperates with a control member 107. A cap member 201 envelopes the cylinder block 106, and has a pair of projecting axle portions 202 which are turnably mounted on bearings 108. Consequently, the cylinder block member including cylinder block 106 and cap 201 is turnable about an axis perpendicular to the axis of drive shaft 101 and of piston carrier 102.

Figure 3:
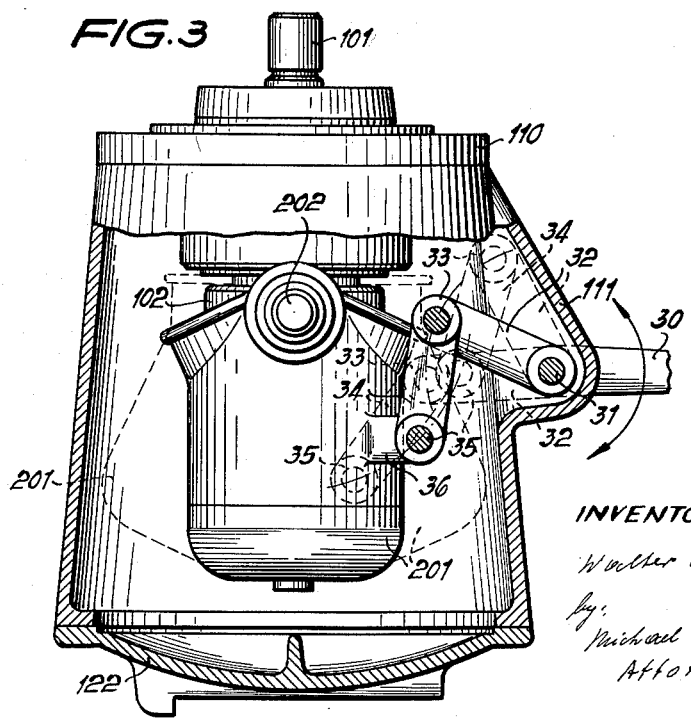
Fig. 3 is a side view, partly in section, of the hydraulic transmission.

As best seen in Fig. 3, cap member 201 can be turned by a lever system. A lever 30 can be turned with a shaft 31 mounted in housing 111, so that lever 32, which is mounted on shaft 31, turns and moves link 34 which is articulated at 35 to a projecting bracket 36 on cap member 201 of pump 1. In this manner, the cylinder block 106 of the swash-plate pump 1 can be turned as indicated in broken lines in Fig. 3 between two end positions in which the flow of liquid is reversed, and an intermediate position illustrated in Figs. 1a and 1b, in which no liquid is pumped.

Bearings 108 are mounted in a pair of supporting members 112 which are secured by bolts to wall means 111, form the main portion of a housing, and have two lateral openings closed by a pair of lateral bearing members 211 in which bearings 121 are mounted. The bottom opening of wall means 111 is closed by a bottom member 122. A bearing plate 110 is secured by bolts to the top portion of wall means 111 and supports bearing means 109 for drive shaft 101.

Suitable sealing means are provided in bearing plates 110 and 211 to seal shafts 101 and 119, so that the housing can be completely filled with a liquid.

Supporting members 112 have inclined faces to which two swash-plate motors 2 and 3 are fixedly secured. More particularly, the control members 113 are fixed to supporting members 114, while the cylinder blocks 114 are turnable on projecting shaft portions of control members 113. The piston carrier members 118 of the motors are rigidly connected to shafts 119 and turn about the axis of bearings 121. Piston rods 117 and pistons 116 move in the cylinders 115 of the motors 2 and 3. The axes of cylinder block members 114 are located in the same plane as the axis of drive shaft 101 and the turning axis of the cap member 201. The axis of each motor cylinder block extends at an acute angle to the axis of pump 1, while the axes of the piston carrier members 118 and of shafts 119 are aligned and extend at right angles to the axis of drive shaft 101 and of pump 1.

The housing parts 110, 111 and 112, and the cap member 201 are formed with conduits 120 through which the pump 1 communicates with the motors 2 and 3 and with a gear pump 4 driven by a gear 204 from gear teeth 205 on drive shaft 101.

Between motors 2, 3 and pump 1, angular spaces are formed in the housing. As shown in Fig. 1b, a filter 91 is located in one space, and is provided with pipes 22 and 23. A thermostat 10 is also located in the space and operates a valve, not shown in Fig. 1b. In the other angular space between motor 2 and pump 1, a spring-loaded valve 13 is arranged.

Due to the use of supporting members 112 for turnably supporting cap member 201 with cylinder block 106, and for rigidly supporting the control members 113 of the motors, a particularly compact construction is obtained so that the conduits 120 are comparatively short, requiring a small amount of circulated liquid in the hydraulic transmission. In this manner, the size of the housing can be reduced to such an extent, as compared with known constructions, that the entire transmission can be built into a standard motor car in place of the conventional differential, with shaft 101 connected to the main shaft driven by the engine, and shafts 119 connected to the wheels.

The function of the elements described with reference to Figs. 1a, 1b and 3, will now be described with reference to Fig. 2 which particularly illustrates the arrangement of the conduit system 120.

Swash-plate pump 1 is connected by conduits 14 and 14' to swash-plate motors 2 and 3. Motor 3 is connected by conduit 15 to conduit 14, and motor 2 is connected by conduit 15' to conduit 14'. The gear pump 4 is connected by conduits 27 and 27', check valves 6 and 7, and conduits 16 and 16' to conduits 14 and 14', respectively. The inlet of the gear pump 4 communicates through conduit 25 with the housing 111, 122 and 211, which is schematically indicated at 12 in Fig. 2. Conduits 17 and 17' are also connected to conduits 14 and 14' and are connected by conduits 18, 18', 19, 19' and two spring-loaded valves 13. A double-valve 8 is connected by conduit 20 to a spring-loaded pressure valve 9 connected by conduit 21 to the filter 91. A conduit 22 connects filter 91 to a conduit 24 which terminates in the housing 12.

A valve 10, controlled by the thermostat 10', is located in conduit 22, and also communicates with conduit 23 leading to a cooling device 11 connected to conduit 24.

When the cylinder block member 201, 106 is in the neutral position illustrated in Fig. 3, no liquid is pumped by pump 1, and shafts 119 do not turn. When control lever means 30 is operated, the cylinder block can be turned about the axis of pivots 202 between two end positions in which the liquid is either pumped into conduit 14 or into conduit 14', and sucked in from the respective other conduit. In the positions between the neutral position and the end positions, smaller amounts of liquid are pumped.

When pump 1 discharges into conduit 14, motor 2 discharges through conduit 15' into conduit 14', and motor 3 receives liquid through conduit 15 and discharges into conduit 14' from where the liquid flows back to the intake of pump 1. Motors 2 and 3 discharge the same amount of oil as is supplied to the same, except for leakage losses. When the cylinder block of pump 1 is turned to the other end position, the direction of flow is reversed, and liquid will flow from pump 1 through conduit 14' to motor 3 and from there through conduit 15 to conduit 14. Liquid will also flow through the parallel conduit 15' to motor 2 and from there into conduit 14. Consequently, the direction of rotation of shafts 119 is reversed, and the vehicle is in reverse.

Since, on the discharge side of pump 1, leakage losses occur, which are partially caused by the use of the liquid as lubricating oil, liquid must be added to the circulating liquid.

The gear pump 4 draws through conduit 25 as a part of the liquid which fills the housing 12, and presses it through conduit 26 into conduits 27 and 27'. On the discharge side of pump 1, the pressure is so high that the respective check valve 6 or 7 closes, so that liquid is pumped by gear pump 4 through the suction side of pump 1. For example, if pump 1 discharges into conduit 14, the gear pump 4 will pump through conduit 27', check valve 7 and conduit 16' into conduit 14'. In this manner, no vacuum can develop in conduit 14' due to oil losses. The pressure of gear pump 4 is maintained at 2 to 5 kg./cm.$^2$. A safety valve 5 communicates with conduit 26 and discharges through conduit 29 when the pressure exceeds a selected maximum pressure.

Gear pump 4 has not only the purpose of replacing the lost oil in the conduits, but effects a circulation of all the oil in the housing 12, corresponding to the housing 110, 111, 122 and 211 in Figs. 1a and 1b. This is necessary for mixing the oil in the housing, and the oil which is circulated in the transmission 1, 2, 3 and the respective conduits. Assuming that pump 1 discharges into conduit 14, the pressure liquid passes through conduit 17 to the control valve 8, the check valve 6 is closed. Valve 8 is so designed that it closes on the side of higher pressure, and at the same time opens at the side of lower pressure communicating with conduit 17'. Consequently, the oil discharged by gear pump 4 passes through conduits 26, 27', check valve 7, conduit 16', conduit 14', conduit 17' and valve 8 into conduit 20 and to valve 9, which is spring-loaded to open at a pressure of 3 to 5 kg./cm.$^2$. Consequently, the same pressure is maintained on the low-pressure side of the transmission, so that the leakage losses are compensated.

It will be noted that at junction 14', 15', 17', and amount of transmission oil flows off, which passes through conduit 21, filter 9' and conduits 22 and 24 into the housing, while the same amount of oil is added by gear pump 4 at the junction 14', 16'. Consequently, the oil in the housing and the oil in the conduits of the transmission mix.

However, the oil in housing 12 may also become hot during a long period of operation, and for this purpose, the thermostat-controlled valve 10', 10. When the temperature in the housing 12 reaches a selected temperature, for example 50° C., thermostat 10' opens the valve 10, so that the oil returned through conduit 21 and filter 9' passes through conduit 23 and a cooling device 11 and is cooled before returning through conduit 24 into housing 12.

A double-acting safety valve means 13 is provided and connected by conduits 18, 18', and 19, 19' to conduits 17, 17'. Assuming that pump 1 discharges into conduit 14, and the pressure in conduit 17 becomes too high, valve 13 will open, and liquid will be discharged through conduit 18, valve 13, conduit 19', 18' into conduit 17'. When pump 1 discharges into conduit 14', the flow is reversed, and excess pressure is relieved through conduit 18', valve 13, conduit 19 and conduit 18 into the low-pressure conduit 17.

Conduits 14, 14', 15, 15' connect motors 2 and 3 in parallel so that the motors may have different rotary speeds while producing the same torque. Assuming that one of the shafts 119 is blocked, then the entire volume of oil discharged by pump 1 will flow to motor 3 and drive the same at twice the rotary speed, as compared with the normal operation where the discharged volume is distributed to both motors. In this manner, a differential effect is obtained which corresponds to the action of a conventional differential gear as required when the vehicle moves along a curve.

Figure 2:
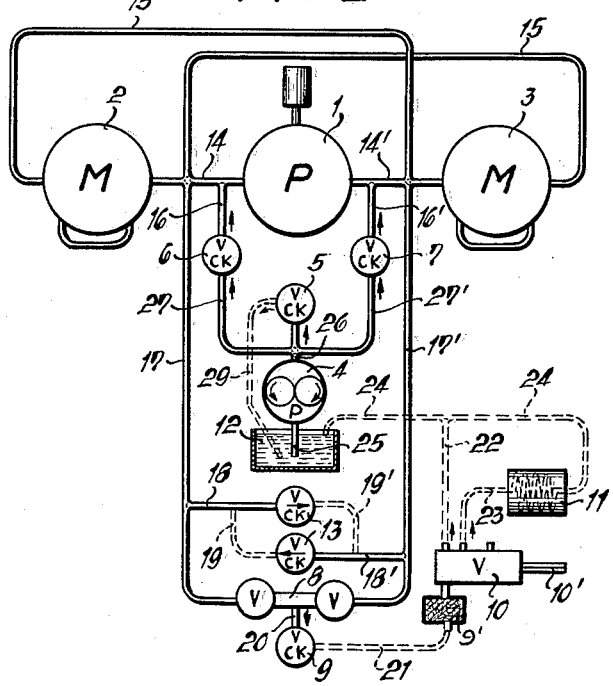
Fig. 2 is a diagram illustrating the general arrangement of a hydraulic transmission according to the present invention.

It will be understood that the conduits described with reference to Fig. 2, are mainly provided in the housing parts 110, 111, and 112, and are indicated by reference numeral 120. Conduits 14 and 14' are partly located in the cap member 201, and shown in Figs. 1a and 1b. Parts of conduits 14 and 14' are also located in the supporting members 112.

It will be understood that each of the elements described above, or two or more together, may also find a useful application in other types of hydraulic transmissions differing from the types described above.

While the invention has been illustrated and described as embodied in a hydraulic transmission including a swash-plate pump means and a pair of swash-plate motor means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Hydraulic transmission comprising, in combination, a housing including an outer casing and spaced supporting portions within said casing; swash-plate pump means including a piston carrier pump member mounted in said housing for rotation about a first axis and a cylinder block pump member mounted in said housing on said spaced supporting portions for angular displacement about a second axis intersecting with said first axis at right angles; drive shaft means extending into said housing and being rigidly connected to said piston carrier pump member for rotating the same; a pair of swash-plate motors located in said housing on opposite sides of said cylinder block pump member of said swash-plate pump means, each motor including a control member fixedly secured to one of said supporting portions, a cylinder block member rotatable on said control member, and a piston carrier motor member rotatably mounted in said housing, the axes of said cylinder block motor members being located in the same plane as said first and second axes and being respectively inclined to each other and to said first and second axes, and said piston carrier motor members having, respectively, axes inclined to the axes of the respective associated cylinder block members; a pair of driven shaft means extending from opposite sides into said housing and being respectively secured to said piston carrier motor members of said motors for being rotated by the same; and conduit means in said supporting portions connecting said cylinder block pump member with said cylinder block motor members.

2. Hydraulic transmission comprising, in combination, a housing including an outer casing and spaced supporting portions within said casing; swash-plate pump means including a piston carrier pump member mounted in said housing for rotation about a first axis and a cylinder block pump member mounted in said housing on said spaced supporting portions for angular displacement about a second axis intersecting with said first axis at right angles, said cylinder block pump member being turnable between an intermediate neutral position and two angularly displaced end positions in which the flow of liquid is reversed; drive shaft means extending into said housing and being rigidly connected to said piston carrier pump member for rotating the same; a pair of swash-plate motors located in said housing on opposite sides of said cylinder block pump member of said swash-plate pump means, each motor including a control member fixedly secured to one of said supporting portions, a cylinder block member rotatable on said control member, and a piston carrier motor member rotatably mounted in said housing, the axes of said cylinder block motor members being located in the same plane as said first and second axes and being respectively inclined to each other and to said first and second axes, and said piston carrier motor members having, respectively, axes inclined to the axes of the respective associated cylinder block members; a pair of driven shaft means extending from opposite sides into said housing and being respectively secured to said piston carrier motor members of said motors for being rotated by the same; and conduit means in said supporting portions connecting said cylinder block pump member with said cylinder block motor members so that said motors are connected in parallel and are rotated in one direction when said cylinder block pump member is in one end position, and are rotated in the opposite direction when said cylinder block pump member is in the other end position.

3. A hydraulic transmission as set forth in claim 1 and including a gear pump driven from said drive shaft means and mounted on said casing, said gear pump having an inlet communicating with the interior of said housing, and an outlet communicating with said conduit means in one of said supporting portions; and a circulated liquid in said housing, in said pump means and motor means, and in said conduit means.

4. A hydraulic transmission as set forth in claim 1 and including articulated lever means including a lever mounted in said housing for turning movement, and another lever articulated to said cylinder block member, a shaft connected to said first mentioned lever and extending out of said housing and being turnable for turning said cylinder block pump member between positions of the same.

5. Hydraulic transmission comprising, in combination, a housing including an outer casing and spaced supporting portions within said casing; swash-plate pump means including a piston carrier pump member mounted in said housing for rotation about a first axis and a cylinder block pump member mounted in said housing on said spaced supporting portions for angular displacement about a second axis intersecting with said first axis at right angles; drive shaft means extending into said housing and being rigidly connected to said piston carrier pump member for rotating the same; a pair of swash-plate motors located in said housing on opposite sides of said cylinder block pump member of said swash-plate pump means, each motor including a control member fixedly secured to one of said supporting portions, a cylinder block member rotatable on said control member, and a piston carrier motor member rotatably mounted in said housing, the axes of said cylinder block motor members being located in the same plane as said first and second axes and being respectively inclined to each other and to said first and second axes, and said piston carrier motor members having, respectively, aligned coinciding axes extending perpendicular to said first axis and being inclined to the axes of the respective associated cylinder block members; a pair of driven shaft means extending from opposite sides into said housing and being respectively secured to said piston carrier motor members of said motors for being rotated by the same; and conduit means in said supporting portions connecting said cylinder block pump member with said cylinder block motor members.

6. Hydraulic transmission comprising, in combination, a housing including an outer casing and a pair of spaced supporting members within said casing; swash-plate pump means including a piston carrier pump member mounted on said spaced supporting members in said housing for rotation about a first axis and a cylinder block pump member, said cylinder block pump member including a pump cylinder block, a control plate, and a cap member enveloping said pump cylinder block and supporting said control plate, said cap member having axial portions formed with passages therethrough and mounted on said supporting members for turning movement about a second axis intersecting with said first axis so that said cap member and pump cylinder block are angularly displaceable about said second axis; drive shaft means extending into said housing and being rigidly connected to said piston carrier pump member for rotating the same; a pair of swash-plate motors located in said housing on opposite sides of said cap member of said swash-plate pump means, each motor including a control member fixedly secured to one of said supporting members in said housing, a cylinder block member rotatable on said control member, and a piston carrier motor member rotatably mounted in said housing, the axes of said cylinder block motor members being located in the same plane as said first and second axes and being respectively inclined to each other and to said first and second axes, and said piston carrier motor members having, respectively, axes inclined to the axes of the respective associated cylinder block members; a pair of driven shaft means extending from opposite sides into said housing and being respectively secured to said piston carrier motor members of said motors for being rotated by the same; and conduit means including a pair of conduits connecting said cylinder block motor members with said pump cylinder block and being partly located in said cap member and in said supporting members and including said passages in said axial portions.

7. Hydraulic transmission comprising, in combination, a housing including an outer casing and a pair of supporting members; swash-plate pump means including a piston carrier pump member mounted in said housing for rotation about a first axis and a cylinder block pump member, said cylinder block pump member including a pump cylinder block, a control plate, and a cap member enveloping said pump cylinder block and supporting said control plate, said cap member being mounted on said supporting members for turning movement about a second axis intersecting with said first axis; drive shaft means extending into said housing and being rigidly connected to said piston carrier pump member for rotating the same; a pair of swash-plate motors located in said housing on opposite sides of said cap member of said swash-plate pump means, each motor including a control member fixedly secured to one of said supporting members, a cylinder block member rotatable on said control member, and a piston carrier motor member rotatably mounted in said housing, the axes of said cylinder block motor members being located in the same plane as said first and second axes and being respectively inclined to each other and to said first and second axes, and said piston carrier motor members having, respectively, axes inclined to the axes of the respective associated cylinder block members; a pair of driven shaft means extending from opposite sides into said housing and being respectively secured to said piston carrier motor members of said motors for being rotated by the same; conduit means including a pair of conduits connecting said cylinder block motor members with said pump cylinder block and being partly located in said cap member and in said supporting members; a liquid in said casing; and means for circulating and cooling said liquid and including valve means and a thermostat controlling said valve means and located in said casing in the space between one of said motors and said cap member.

8. A transmission as set forth in claim 6 and including a gear pump driven from said drive shaft means and located in said housing, said gear pump having an inlet communicating with the interior of said housing, and an outlet communicating with said conduit means; and a circulated liquid in said housing, in said pump means and motor means, and in said conduit means.

References Cited in the file of this patent
UNITED STATES PATENTS

| | | |
|---|---|---|
| 1,263,180 | Williams | Apr. 16, 1918 |
| 1,817,063 | Carrie et al. | Aug. 4, 1931 |
| 2,553,655 | Herman et al. | May 22, 1951 |
| 2,736,499 | Hazen | Feb. 28, 1956 |
| 2,872,876 | Thoma | Feb. 10, 1959 |

FOREIGN PATENTS

| | | |
|---|---|---|
| 216,631 | Great Britain | June 5, 1924 |